United States Patent

Lindholm

[15] 3,687,487
[45] Aug. 29, 1972

[54] UNIVERSAL CONNECTOR

[72] Inventor: Edward J. Lindholm, 3044 Daytona Ave., Cincinnati, Ohio 45211

[22] Filed: March 23, 1970

[21] Appl. No.: 21,645

[52] U.S. Cl. .................... 285/55, 138/89, 285/373, 285/DIG. 2
[51] Int. Cl. ........................... F16l 9/14, F16l 21/06
[58] Field of Search........ 285/373, 419, 55, 112, 412, 285/DIG. 2, 365, 367, 366, 407, 410, 411; 138/89

[56] References Cited

UNITED STATES PATENTS

| 3,266,821 | 8/1966 | Safford | 285/55 X |
| 328,427 | 10/1885 | Nusbeck | 285/DIG. 2 |
| 2,818,055 | 12/1957 | Hovde | 285/373 X |
| 2,073,338 | 3/1937 | Durkee | 285/373 X |
| 3,134,612 | 5/1964 | Glasgow | 285/373 X |
| 3,041,088 | 6/1962 | Brandon | 285/373 X |

FOREIGN PATENTS OR APPLICATIONS

| 4,274 | 9/1931 | Australia | 285/112 |
| 42,037 | 10/1925 | Norway | 285/412 |

Primary Examiner—Thomas F. Callaghan
Attorney—J. Warren Kinney, Jr.

[57] ABSTRACT

The connector involves a clamping ring having interior grooves and ribs complementing external grooves and ribs of two elements requiring connection; the grooves and ribs each carry camming faces acting to enforce longitudinal movement of the two connectable elements towards one another incident to radial contraction of the clamping ring, whereby a gasket between said connectable elements is subjected to compressive force resulting in an effective seal.

6 Claims, 7 Drawing Figures

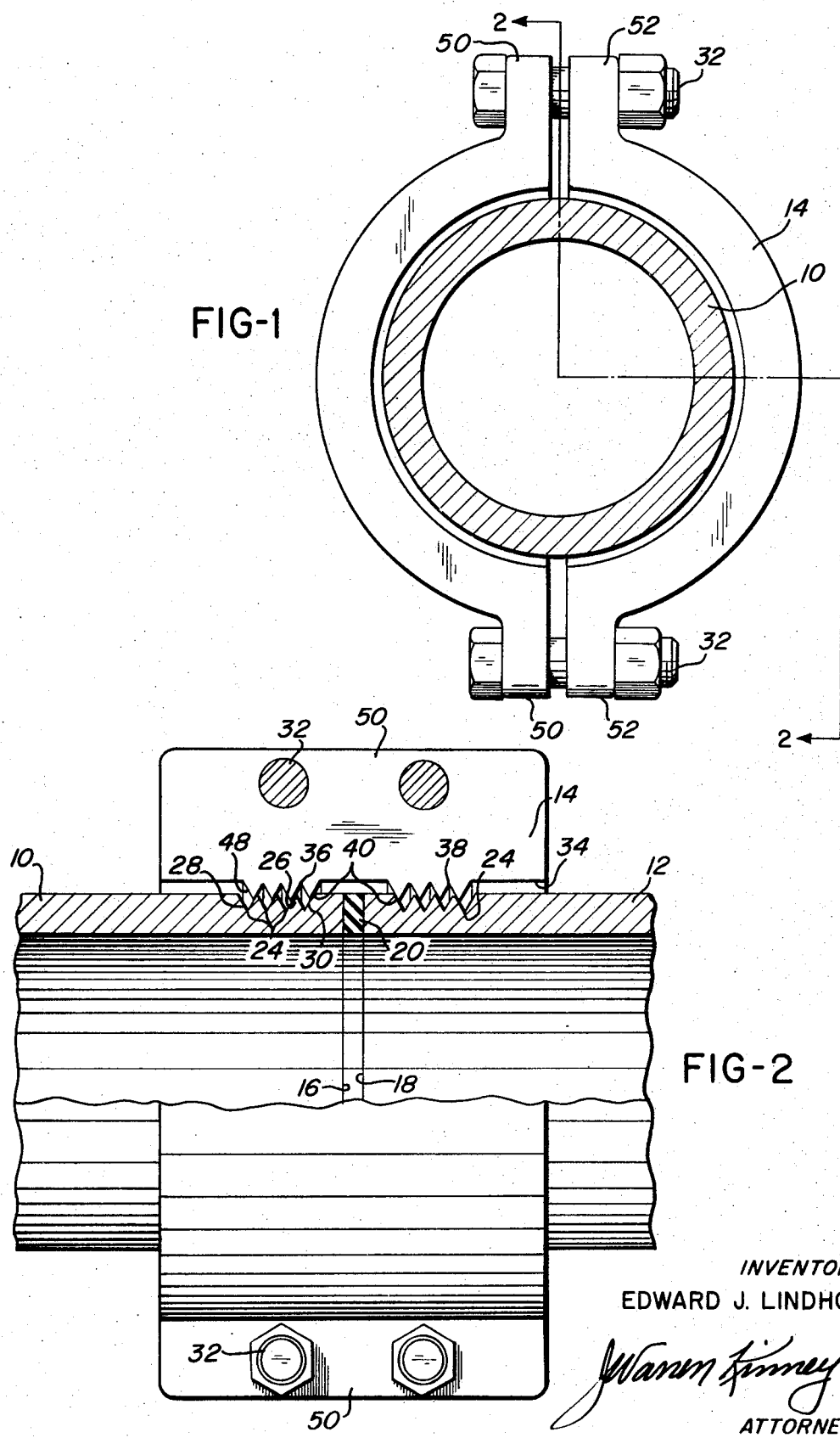

INVENTOR
EDWARD J. LINDHOLM
BY
ATTORNEY

UNIVERSAL CONNECTOR

This invention relates to a universal connector, or a connecting means for joining an accessory element to a body element of one kind or another, whether or not said elements are alike in form.

The connector of the invention has a wide variety of applications, some examples of which relate to the joining of two pipes or tubes axially aligned; or the joining of a pipe section and a cap or cover therefor; or the joining of two bodies in firm endwise abutment whether tubular or solid, or whether or not such bodies are of cylindrical or other cross-sectional shape; these being a few of many possible applications that may be mentioned by way of example.

An object of the invention is to provide an improved connecting means for joining two elements in firm endwise abutment upon one another, or upon a gasket or other insert interposed between said two elements.

Another object of the invention is to provide an improved connecting means of the character stated, which is simple and inexpensive to manufacture, and easy to apply in the field or on the job without the employment of skilled labor.

Another object is to provide a connecting means which when applied to hollow elements for the containment or transfer of gases and fluids, is leak-proof and self-adjusting as well as structurally strong and durable.

A further object of the invention is to a provide a connecting means of the character referred to which may be fabricated in various sizes and types, and from various materials, for the performance of different types of service.

Another object is to provide means for effecting a durable joint or connection characterized by high tensile and compressive strength.

A further object of the invention is to provide an improved connecting means which has many useful applications in various fields of endeavor.

The foregoing and other objects are attained by the means described herein and illustrated upon the accompanying drawings, in which:

FIG. 1 is an end elevational view of a pipe or tube connection effected by the means of the present invention, including a clamp member or tension ring.

FIG. 2 is an enlarged cross-section taken on line 2—2 of FIG. 1 and showing the clamp member thereof in relaxed or inoperative condition.

FIG. 7 is an elevational view, partially in section, illustrating the invention associated with a manhole cover which controls access to the interior of a manhole opening which projects from and is in open communication with a pressure vessel, or the like.

It is pointed out that the accompanying drawings show merely a few of many applications for which the present joint or connection is suited, wherefore the disclosures of the drawings are not to limit the scope of use of the invention. For example, in FIGS. 1 and 2, the elements 10 and 12 to be connected, while shown as pipes or tubes cylindrical in cross-section, may as well be solid bodies to be connected by means of a clamp member or tension ring 14, and moreover, the parts 10, 12 and 14 may have cross-sectional shapes other than cylindrical, if desired.

Figure 4:
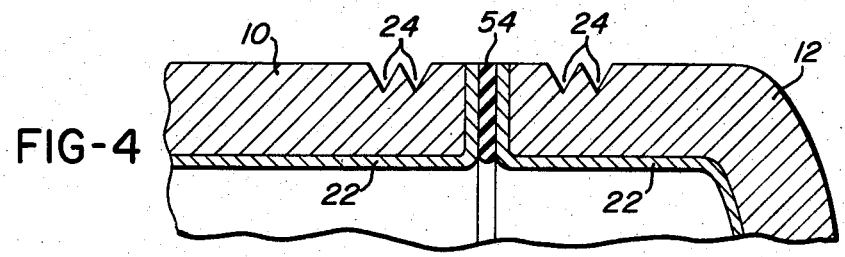
FIG. 4 is a cross-sectional view similar to FIG. 1, and showing a modification, the clamp member or tension ring being omitted.

Also, as suggested by FIG. 4, one of the elements to be connected to another may be in the form of a cap or cover or other form of fitting or accessory, shown at the right of FIG. 4. Thus, the element 10 of FIG. 4 might be the neck of an access port or manhole of a retort or other vessel, upon which a cover is to be secured. Quite obviously the uses for the connecting means are manifold, and will be recognized by persons conversant with various arts not necessarily related to one another.

With reference now to FIGS. 1 and 2, the elements 10 and 12 are exemplefied as tubular bodies, cylindrical of cross-section, having aligned ends 16, 18. Said ends may abut one another, or may be separated by a ring-shaped gasket 20 of any appropriate kind capable of limited distortion when compressed between the body ends 16, 18. The gasket may or may not possess the characteristic of resiliency, though it will necessarily be flexible and distortable, and capable of effecting a leak-proof seal with the body ends.

The bodies or elements 10 and 12 to be joined, may be formed of any appropriate material, such as a metal, plastic, ceramic, or composition material suitable to contain or convey various types of fluids, including corrosive liquids or gases under high pressure or varied temperature conditions. If desired, the bodies or elements to be joined may carry a suitable lining material as indicated at 22 upon FIG. 4, in accordance with practices common in certain industries.

According to the present invention, the bodies or elements 10 and 12 are provided with a series of circumferential spaced grooves 24 separated by spaced ridges 26. The alternate grooves and ridges are not screw threads, but are endless and therefore do not interconnect one with another. Preferably, the first groove of a series is adequately spaced from the body end to protect the groove and its adjacent ridge from damage or mutilation in handling or shipment.

Figure 6:
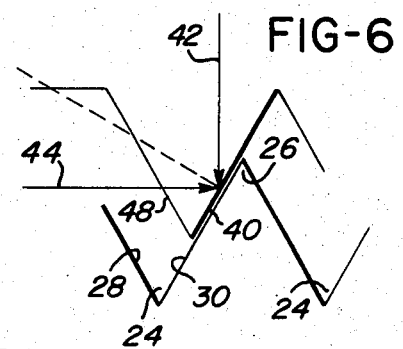
FIG. 6 is an enlarged diagram indicating forces acting within the joint or connection when placed under stress.

The grooves 24 preferably have straight or planar inclined divergent faces 28 and 30, FIG. 6, defined by the base of the groove and the peak of an adjacent ridge 26. The meeting inclined faces of any two adjacent grooves result in the formation of a wedge which includes a cam face such as 30, as is evident from the drawings. The number of grooves and ridges provided on any end portion of a body or element, will be determined by the type or the demands of the service the connection is expected to perform.

Both of the bodies or elements 10, 12 have endless grooves provided thereon as above described and as illustrated by the drawings. The clamp member or tension ring 14, which is adapted to substantially surround the end portion of two adjacent bodies or elements to be connected, may be formed of any number of arcuate segments to be held in position by means of bolts 32 or equivalent fastening devices. If desired, the clamp member may be made in one piece, with sufficient inherent flexibility present to permit contraction thereof about the body ends with considerable force.

The inner arcuate surface 34 of the clamp member or ring 14, is provided with two sets of endless grooves 36, 38, which are complementary to the grooves of the body elements 10, 12. The groove sets 36 and 38 extend 360 degrees around the body elements, and are spaced apart to approximately accommodate the peaks of the body element grooves when said elements are butted endwise upon one another or upon an interposed gasket 20.

Figure 3:
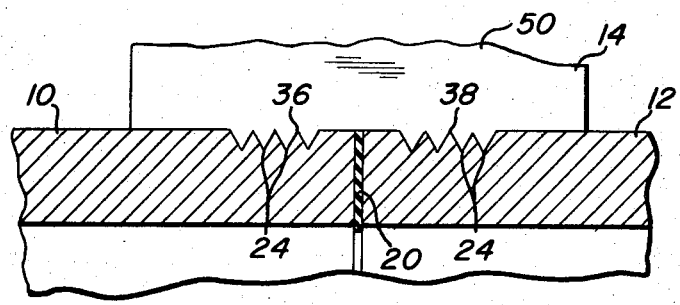
FIG. 3 is a view similar to FIG. 2, showing the clamp member contracted to effect a tight and rigid connection between two hollow bodies.

It should be noted, according to FIG. 2, that the sets of grooves in the clamp member are initially offset from the peaks of the grooves of elements 10, 12 when said elements are posed for connection, so that contraction of the clamp member acts to forcefully drive or wedge the elements axially toward one another, to compress the gasket 20 as in FIG. 3. That is, the inner inclined cam faces 40 of the clamp member grooves impinge upon the correspondingly inclined cam faces 30 of the body element grooves, to enforce a longitudinal relative displacement of the parts 10, 12 and 14 as part 14 is contracted about the parts 10 and 12.

The aforesaid camming action is readily evident from the diagram of FIG. 6, wherein the radial force resulting from contraction of the clamp member or ring is denoted 42, and which force acting against cam face 30 produces longitudinal motion at approximate right angles to force 42 indicated by the arrow 44. It may here be noted that the groove faces 28 and 48 are not pressure or force translative areas, wherefore the slope of faces 28 and 48 perform no very important function in effecting a tight or firm joint unless and until said faces 28 and 48 come into firm contact one upon the other, when by firm abutment they may enhance the strength of the joint.

It is here pointed out that tightening the clamp member 14 about the elements 10 and 12 (FIG. 2) may be resisted by gasket 20 to the extent of precluding face to face abutment of the passive or secondary groove areas 28 and 48; however, in some instances the areas 28 and 48, as in FIG. 3, may reach a state of firm or forceful flatwise abutment.

The loading of gasket 20 can be controlled by the extent to which the clamp bolts 32 are tightened, or by limiting the space between the clamp ears 50, 52 as by means of shims or the like. Gasket compression may be controlled also by altering the inclination of the cam faces 30 and 40. The gasket loading factor may be important when the material of the gasket is incapable of withstanding high compressive forces resulting in permanent injury or destructive crushing of the gasket.

The illustration of FIG. 4 suggests that the body elements 10 and 12 may carry an internal lining material 22, applied usually for the purpose of resisting attack by corrosive fluids. FIG. 4 suggests also that one body element, such as 12, may be a cap cover or other fitting attachable to element 10 by means of the connection forming the subject matter of the present invention, and wherein the number of grooves 24 is shown reduced. In this case, the clamp member or tension ring to be applied would carry ribs or ridges corresponding in number to the number of grooves 24.

In a typical application of the FIG. 4 disclosure, element 12 may be a manhole cover for an access opening of a retort or other vessel, the access opening being provided by the tubular element 10. A clamping member or ring quite similar to member 14 may quickly and easily be applied to secure the manhole cover 12 in the manner previously explained, and the same may just as easily be removed. In the past, the manhole cover was comparatively heavy, and common practice was to secure it in position over the access opening using as many as two dozen bolts and nuts applied circumferentially of the cover. Utilizing the present invention, the cover may be safely reduced in weight for handling by one man, and only one or two bolts and nuts or equivalent fasteners need be manipulated, thereby saving much time and labor.

The lining material 22 may or may not be needed, depending upon service requirements. The sealing means or gasket 54 might possibly be omitted if the lining material 22 is such as to have sealing characteristics.

Figure 5:
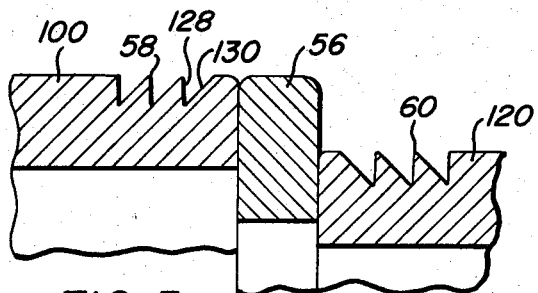
FIG. 5 is a cross-sectional view generally similar to FIG. 1, showing a second modification from which the clamp member or tension ring is omitted.

FIG. 5 is a view of a modification, wherein the body elements 100 and 120 are of different external diametral dimensions, and are separated by a spacer 56. The clamping member or tension ring in this case would be in the form of a reducing adapter having sets of grooves to complement the sets of ribs or ridges 58 and 60. As herein shown, the ribs or ridges have active cam faces 130 corresponding to those at 30 of FIG. 6, but which incline at an angle not equivalent to the angle of inclination of face 128, the latter being nearly or substantially normal to the longitudinal horizontal axis of element 100.

In the example of FIG. 5, the spacer 56 could be formed of any material capable of effecting a seal or a satisfactory connection; that is, it might be rubberized, or coated with any suitable sealing substance if desired. As was previously explained, the groove faces 130 are the camming faces which secure the connection. The degree of inclination of faces such as 128 is a matter of relative immateriality.

The universal connector herein disclosed provides a superior or leak-proof joint capable of effective use under conditions involving great pressure and temperature extremes. If not completely tightened in use, the connection is self-tightening. Any transverse expansion of piping incorporating the present invention will increase the longitudinal force compressing the gasket, and pressure of fluid within the pipe system urges the gasket radially against the clamp member inner wall, thereby affording additional assurance of a tight seal, and positive insurance against gasket blow-out.

Figure 7:
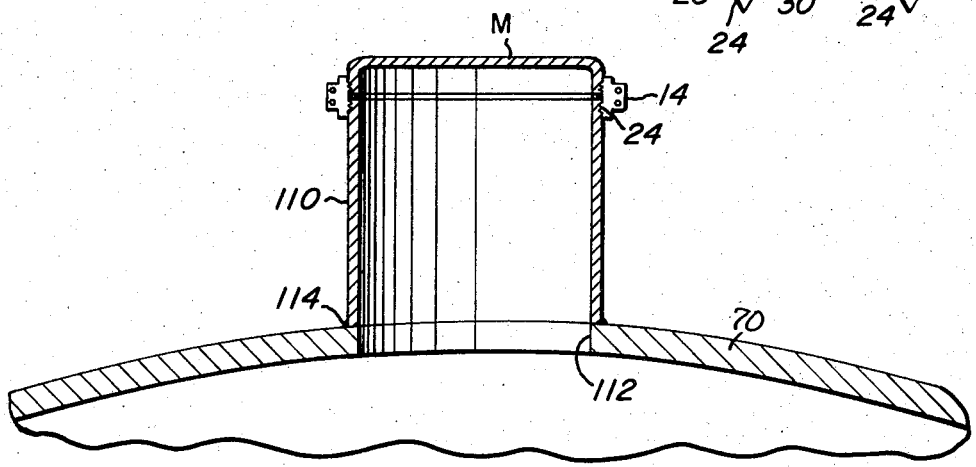

With particular reference now to FIG. 7, the numeral 70 denotes generally a conventional pressure vessel capable of withstanding high pressures. Access to the interior of said vessel is afforded by a manhole opening or vessel closure comprising a body element 110 one end of which is secured to an opening 112 in the vessel such as by a weld 114. The outer end of element 110 is externally grooved as at 24 for cooperation with a clamp member or tension ring 14, it being understood that the manifold cover M is also provided with grooves at 24 which are engaged by member 14.

From the foregoing it will be noted that the members being connected may be of steel, cast iron, other metals, stoneware, glass, plastic or any other suitable material whether lined or unlined.

A significant advantage attributable to the invention relates to the salvage or ease of reclamation of the connected members, and the fittings used in effecting said connection; it being noted that connected members may be conveniently disassembled or dismantled by removing the connector elements, with the result that the exposed ends of the connected members require no re-finishing in the event they are to be reused, as in the case of welded joints, such as heretofor used. In other words a member which has been disconnected from, say a pipe-line, may be immediately reused and reconnected without requiring any refurbishing action.

When the subject invention is used in connection with cast iron pipe it has a particular advantage that thrust blocks, or tie rods are not required, as in the case of conventional bell and spigot, or other types of mechanical joints, which require special means to keep joints from separating under longitudinal stresses induced by the pressure of the media in the pipe.

It should be further noted that the effectiveness of the gasket seal is not adversely affected by temperature changes in the fluid passing through the pipes, since heat transfer is quite rapid due to the large area of contact between the interengaged portions of the clamp and pipe which results in a low differential temperature between the clamping means and the pipe.

Likewise, any differential expansion is negligible when compared to the elasticity of the gasket and pipe materials.

With particular reference now to the gasket or sealing material it should be understood that it may be flat, O-ring, delta or other commonly used shape, and of any material suitable to and uneffected by the particular media being handled and with regards to temperature conditions and the materials of construction of the other parts of the connector.

What is claimed is:

1. A joint or connection comprising in combination: two tubular body elements to be joined, said body elements each being of circular configuration and of substantially equal diameter, each body having a plurality of endless grooves spaced apart to provide a peak between successive grooves, the peaks being of substantially the same diameter as the body elements with the grooves having a less diameter then the body elements, the outermost groove being inwardly of the end of the body element and the end outwardly of the grooves being of the same diameter as the body element, each peak having a camming face and a secondary face, the camming faces facing in a direction away from the ends of the body elements and being inclined at an acute angle to a plane which includes a base of each groove, a two-part contractable clamp, each part being of semicircular configuration and substantially surrounding the grooves and peaks of both body elements when juxtaposed, each clamp part having two sets of grooves and peaks internally thereof and spaced apart substantially equal to the spacing of the grooves and peaks on the two body elements, each clamp part having a central portion and end portions, the central portion and the end portions being of substantially the same diameter throughout, the peaks of the two clamp parts being of a less diameter than the diameter of the central and end portions and the base of the grooves of each clamp part being of substantially the same diameter as the diameter of the central and end portions, the peaks of the clamp parts having a camming face inclined at an acute angle to a plane which includes the base of the groove and the central portion of the clamp parts, the camming faces of each peak of the clamp parts being complementary to the camming faces of each body element, flexible and compressible sealing means positioned between the ends of the body elements, the sealing means having outer and inner edges, means to connect the clamp parts together and to contract the clamp parts about the body elements with the camming faces of the clamp parts in sliding contact with the camming faces of the body elements, the force of contraction of the clamp parts being at right angles to the force applied to the respective camming faces and effecting shifting of the body elements toward one another incident to the contraction of the clamp parts, the shifting of the body elements compressing the sealing means, the clamp parts when contracted having the central and end portions in engagement with the ends and those parts inwardly of the grooves and peaks of the body elements, the central portions of the clamp parts engaging the outer edge of the sealing means and preventing extrusion of the sealing means beyond the outer surface of the body elements and maintaining the sealing means between the ends of the body elements and effecting a good seal within the joint.

2. The combination as defined by claim 1, wherein the body elements are coated with a lining material, a portion of which coating is exposed between the adjacent ends of the body elements for compression therebetween as the clamp member undergoes contraction.

3. The combination as defined by claim 1, wherein one body element is in the form of a cover for one end of the other tubular body element.

4. The combination as defined by claim 1, wherein is included means for inhibiting corrosion of the body elements.

5. The combination as defined by claim 1, wherein said means to contract the clamp member is adjustable as to the extent of contraction thereof.

6. The combination as defined by claim 5, wherein one body element is in the form of an accessory fitting for one end of the other tubular body element.

* * * * *